No. 787,918. PATENTED APR. 25, 1905.
N. W. HARTMAN.
GAS ENGINE STARTER.
APPLICATION FILED MAR. 14, 1904.
3 SHEETS—SHEET 1.
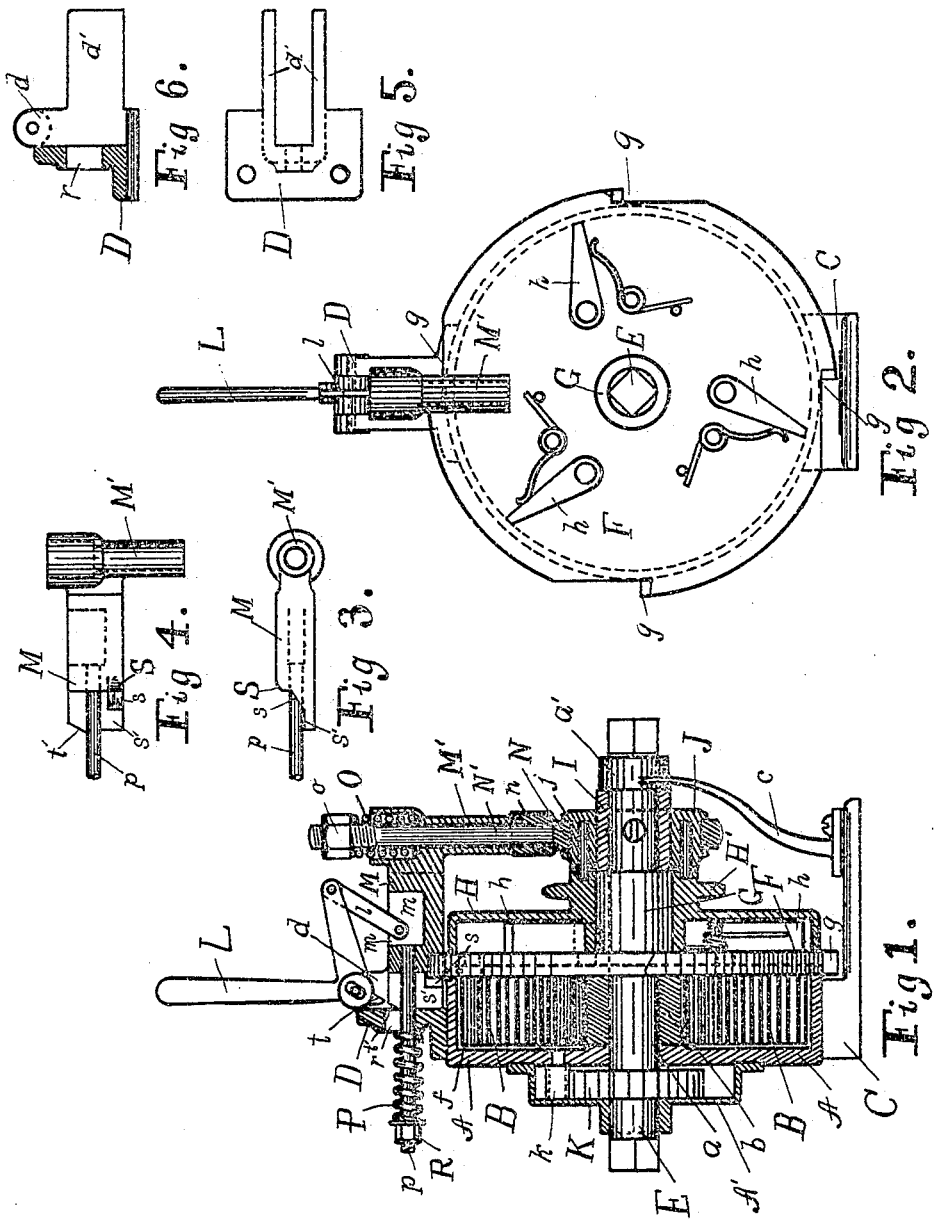
Witnesses.
Inventor.
Noble W. Hartman,
By Owen & Owen,
His attorneys.

No. 787,918. PATENTED APR. 25, 1905.
N. W. HARTMAN.
GAS ENGINE STARTER.
APPLICATION FILED MAR. 14, 1904.

3 SHEETS—SHEET 2.

Witnesses.
Powell Schreiber.
Emil J. Vogelsang.

Inventor.
Noble W. Hartman,
By Owen & Owen,
His attorneys.

No. 787,918. PATENTED APR. 25, 1905.
N. W. HARTMAN.
GAS ENGINE STARTER.
APPLICATION FILED MAR. 14, 1904.

3 SHEETS—SHEET 3.

Witnesses.
Powell Schreiber.
Emil J. Vogelsang

Inventor.
Noble W. Hartman
By Owen & Owen,
His attorneys.

No. 787,918. Patented April 25, 1905.

UNITED STATES PATENT OFFICE.

NOBLE W. HARTMAN, OF TOLEDO, OHIO, ASSIGNOR TO THE GAS ENGINE STARTER COMPANY, OF TOLEDO, OHIO, A CORPORATION OF OHIO.

GAS-ENGINE STARTER.

SPECIFICATION forming part of Letters Patent No. 787,918, dated April 25, 1905.

Application filed March 14, 1904. Serial No. 198,023.

*To all whom it may concern:*

Be it known that I, NOBLE W. HARTMAN, a citizen of the United States, and a resident of Toledo, in the county of Lucas and State of Ohio, have invented certain new and useful Improvements in Gas-Engine Starters; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to mechanically-operated means for starting gas and other classes of compression engines; and it has for its object the provision of a simple form of mechanism that will first communicate the initial movement to an engine or overcome the effect of a premature explosion and then be operated by the engine thus started to restore its initial energy, so as to be in readiness for use in again starting the engine.

Further objects of my invention will be apparent and more fully explained in the following specification, of which the accompanying drawings form a part, in which—

Figure 9:
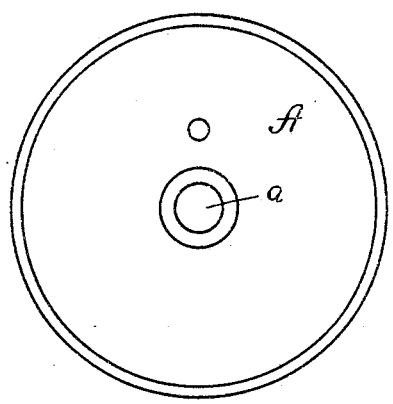
Figure 10:
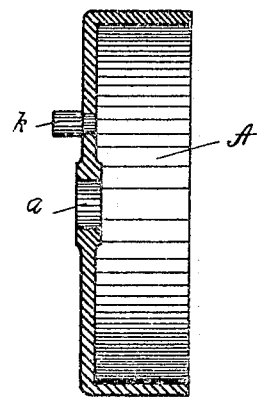
Figures 7, 8:
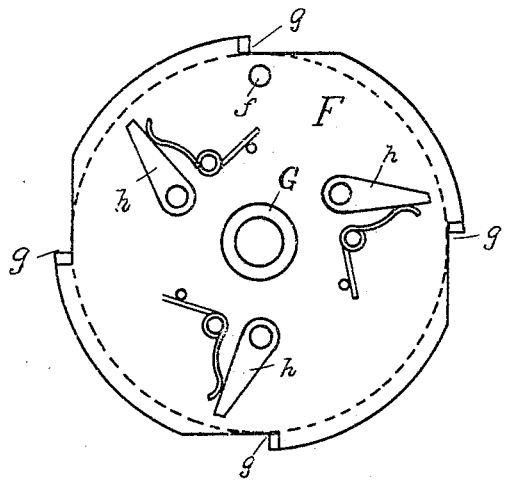
Figure 11:
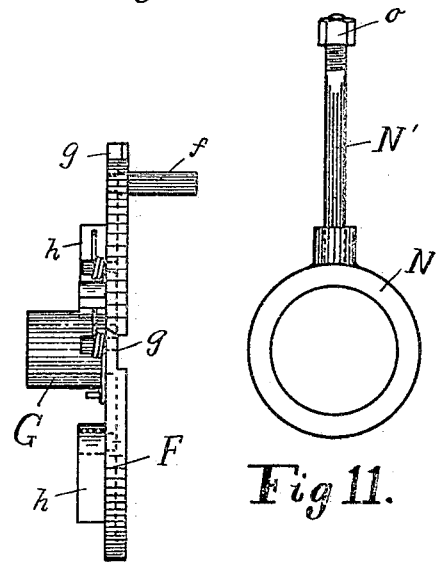
Figure 18:
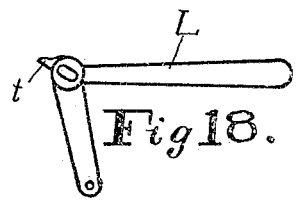
Figure 19:
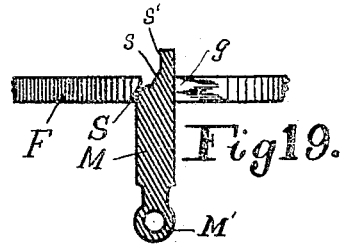
Figure 14:
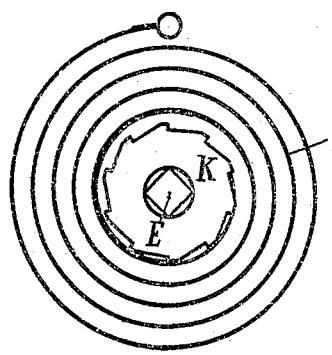
Figure 15:
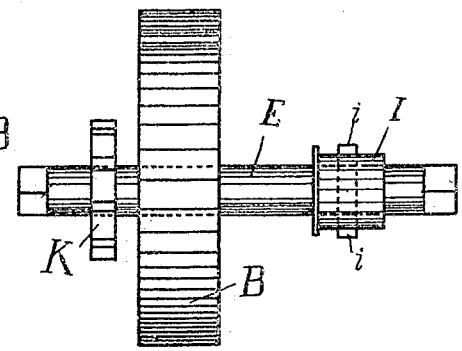
Figure 12:
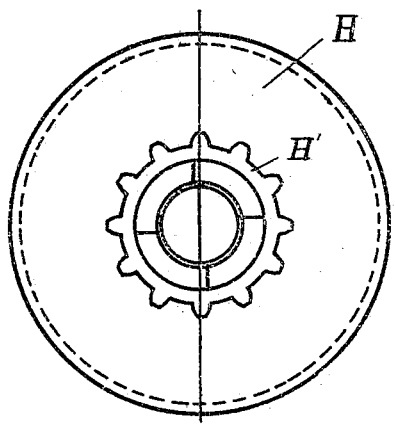
Figure 13:
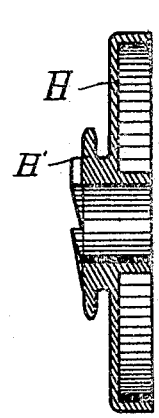
Figure 17:
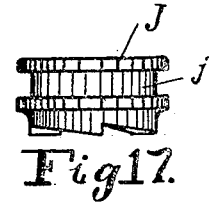
Figure 16:
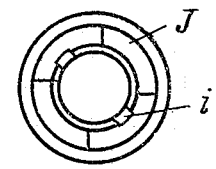

Figure 1 is a vertical transverse sectional view of a portion of the parts comprising my invention, showing the mechanism assembled and in operative position. Fig. 2 is a side elevation of the locking disk and block and controlling-lever. Figs. 3 and 4 are bottom plan and side elevational views, respectively, of the locking-block. Figs. 5 and 6 are bottom plan and central vertical sectional views, respectively, of the stationary member to which the operating-lever is fulcrumed. Figs. 7 and 8 are side and end views, respectively, of the locking-disk. Figs. 9 and 10 are side and transverse vertical sectional views, respectively, of the stationary housing for the coiled actuating-spring. Fig. 11 is a plan of the clutch-encircling sleeve and stem. Figs. 12 and 13 are a side elevation and vertical section, respectively, of the sprocket-disk through which motion is communicated to the driving-shaft of an engine. Figs. 14 and 15 are different views of the actuating-spring and winding-shaft. Figs. 16 and 17 are separate views of the clutch member, which is feathered to the shaft and adapted to be thrown into engagement with the sprocket-disk. Fig. 18 is a plan of the operating-lever, and Fig. 19 is a plan of the locking disk and block, with the latter in horizontal section, showing the relative positions of said parts when the other parts are in the positions shown in Fig. 1.

Referring to the drawings, A represents a vertically-disposed cylindrical housing or shell for incasing the coiled actuating-spring B, said shell being supported in proper elevated position by means of the base member C, to which it is secured in any suitable manner and having bolted or otherwise centrally secured to its upper surface the transversely-disposed stationary bracket D, as shown in Fig. 1.

A horizontal shaft or arbor E, which is shown as having its ends squared to receive a winding key or crank, has one end journaled in a bearing $a$, provided axially of the housing A, and its other end mounted in the bearing $a'$, which is elevated in proper position above the base C by the standard $c$. Loosely mounted on the shaft E in flush position to the inner peripheral edge of the housing A is the driving-disk F, which is of slightly greater diameter than said housing and has its inner surface cylindrically bored a portion of its width, as shown by dotted lines in Figs. 1, 7, and 8, to adapt it to inclose a portion of the contiguous edge of said housing. The coiled spring B, which is inclosed within the housing A and is of any desired tension, has its outer end engaged to a stud $f$, which projects from the inner face of the disk F, and its inner end secured to the sleeve $b$, said sleeve being keyed to the shaft E intermediate of the disk F and the bearing $a$ of said housing.

Rigidly secured to the outer surface of the disk F is a hub or sleeve G, which surrounds the shaft E and has loosely mounted thereon the sprocket-disk H, the latter having a sprocket H' formed integral with its hub and its peripheral edge inwardly flanged and extending in flush position to the outer face of the disk F. Rotation is communicated from the disk F to the disk H and sprocket H' through the medium of the spring-pressed pawls $h$, which are mounted on suitable studs projecting from the adjacent face of said disk F and adapted to frictionally engage the inner surface of the peripheral flange of the disk H, thus causing said disk H to rotate with the disk F when the latter is impelled in one direction by the actuating-spring B. A sprocket-chain (not shown) communicates motion to the driving parts of an engine from the sprocket H'.

A sleeve I is rigidly keyed to the shaft E between the bearing $a'$ and sprocket H' and has mounted thereon an ordinary pin or toothed clutch J, which slides on a feather $i$ provided on said sleeve and is adapted to engage companion clutch-teeth on the hub of said sprocket (shown in Figs. 12 and 13) and cause a rotation of the shaft E, as hereinafter described.

Upon the end of the arbor E, which projects beyond the outer face of the housing A, is keyed a ratchet-wheel K, the teeth of which are so arranged as to engage a pawl $k$, pivoted to said casing, and permit a rotation of said arbor only in the direction in which the spring B is coiled. The said pawl and ratchet are shown as being incased within a housing A', which is suitably secured to the main housing A.

The movements of the actuating parts of my invention are controlled by the bell-crank lever L and connected locking-block M, the former being fulcrumed between the elevated forked portions $d$ of the stationary bracket D and connected to said block by means of the link $l$, which is pivotally secured within a socket $m$ provided therein for its reception and the latter being adapted to have a vertical and horizontal reciprocatory movement between the horizontally-extended portions $d'$ of said bracket. A vertically-disposed hollow shank M' is formed integral with or otherwise rigidly secured to the end of the block M, disposed over the sliding clutch J, and has connection therewith through the encircling sleeve N, which is loosely seated in a peripheral groove $j$, provided in said clutch, and the vertical stem N', which latter extends loosely through the hollow shank M' and has its lower end rigidly secured within a boss $n$, provided on said sleeve, and its upper end projected above said shank and encircled by a coiled expansion-spring O, the said spring resting in a receiving-socket provided in the upper portion of said shank and being held in proper tension with respect thereto by means of the adjusting-nut $o$. The movement of the block M normally tends toward the rear of the bracket D by reason of the coiled expansion-spring P being mounted on the horizontal stem $p$, which passes through an elongated vertically-disposed aperture $r$ in said bracket and has its inner end secured to the adjacent end of said block M and its outer end provided with an adjusting-nut R, the said spring bearing against the outer face of said bracket and said nut.

In order to enable the block M to engage with and lock the driving-disk F against movement, as is more fully hereinafter described, I provide a series of peripheral notches $g$, which have portions of their engaging surfaces beveled and portions cut in transverse relation to said disk, as shown in Fig. 19. At different stages in the operation of my device the block M is adapted to be engaged in two separate positions by one of the notches in the disk F when the latter is at rest—first, in the position shown in Figs. 1 and 19, with the bevel of one of the notches $g$, bearing against the rounded shoulder S, provided on the adjacent portion of said block, when the clutch J is thrown into operation for the purpose of rotating the shaft to rewind the spring B after it has spent more or less of its energy in the starting operation; secondly, in a normal or at-rest position, (not shown,) with the beveled portion of the engaging notch flush with the beveled shoulder $s$, provided on said block, and the transverse portion of the notch bearing against the straight portion $s'$ of said block, which is occasioned by reason of the spring B being wound to a tension sufficient to overpower the tension of the spring P on the stem $p$, thus enabling the block M to be moved to the second position, thereby disengaging the clutch J from the sprocket H' and stopping the winding operation. The spring P is so tensioned with respect to the actuating-spring B as to adapt it to be contracted to permit of the block M being moved to disengage said clutch as soon as the spring B has been wound to the desired tension.

A slightly-inclined lug $t$ is provided on the lever L below its fulcrum-point and is adapted to engage the beveled edge $t'$ of the block M and assist in retaining it in one of the operative positions to which it has been thrown by a manipulation of the lever, as hereinafter described.

When it is desired to start an engine with which my improved starter is connected or to overcome the effect thereon of a premature explosion, the lever L is thrown to the left, thus raising the block M out of the path of the notches $g$ on the disk F and at the same time causing the bevel $t'$ to be engaged by the lug $t$ of said lever in order to counteract the tension of the spring P, which would otherwise cause said block to move to the left as soon as released from the disk F, and thus throw the clutch J into operative engagement. By reason of the coiled spring B having its outer end engaged to the stud *f* on the rotatable disk F and its inner end secured to the shaft E, which is locked against an unwinding movement by the pawl *k* and ratchet K, it is caused to have a centripetal uncoiling movement and to energize and communicate rotation to the disk F instantly upon its being released by the raising of the locking-block M. The rotation of the disk F causes the pawls *h* to lock against or frictionally engage the peripheral flange on the disk H, and thereby impart motion to said disk H and the sprocket H', the latter in turn communicating motion to the crank-shaft of the engine with which it is associated through the medium of a sprocket-chain or in any other suitable manner. The spring B is of sufficient power and size to impart the number of revolutions to the engine-shaft necessary to the proper operation of the sparker and starting of the engine. As soon as the engine is properly started or the spring B has spent its force the operator releases the lever L to permit the block M to move to the left, it being actuated by the spring P, and to drop into engagement with one of the notches *g* on the disk F thus locking said disk against movement and throwing the sliding clutch J into operative engagement with the clutch on the sprocket H', which is then being rapidly rotated independently of the disk F by reason of its connection with the crank-shaft of the engine. The throwing into operation of the clutch J, which is feathered to the shaft E, causes an instantaneous rotation of said shaft in the direction of the winding of the spring B and a consequent rewinding of said spring to its normal tension. As soon as the spring B has been wound to a tension sufficient to overpower the expanding strength of the spring P the block M is forced to the right by reason of the beveled edge of the notch *g* pressing against the rounded shoulder S and sliding therefrom into engagement with the portions *s* and *s'* of said block, as above described, thus automatically moving the clutch J out of engagement with the sprocket H' and stopping the rotation of the shaft E and winding of the spring B. It will thus be seen that after the spring B has spent its force in starting the engine with which it is connected the energy of the engine is utilized to cause an automatic rewinding of said spring and the throwing of the parts into inoperative position after sufficient energy has been stored in the apparatus to again start the engine when required.

I have found by experimenting that the centripetal unwinding of a coiled spring will impart a force of longer duration and greater energy to a connected object than will the centrifugal unwinding of the same spring. If the stud *f* in the drawings to which the outer end of the spring is secured were stationary and the unwinding of the spring imparted rotation to the shaft E, it is apparent that the central unwinding of the spring would be more or less retarded by reason of the frictional contact of the tightly-wound coils during the unwinding movement and also that the sudden unwinding of the central coils would cause the outer coils to be locked against movement, thereby limiting the rotation to be imparted to the shaft. In my arrangement the centripetal unwinding of the coils reduces the frictional contact thereof, thereby increasing the power efficiency and imparting a greater number of revolutions to the impelled object.

It is obvious that such changes in the form, proportion, and minor details of construction of the parts as fairly fall within the scope of my invention may be made without departing from the spirit or sacrificing any of the advantages thereof.

Having thus described my invention, what I claim as new, and desire to obtain by Letters Patent, is—

1. In an apparatus of the class described, a normally stationary shaft rotatable in one direction, a coiled spring secured thereto, a rotatable member actuated by said spring, a sprocket adapted to be rotated by and to have rotation independent of said member, a clutch adapted when thrown into operation to actuate said shaft to wind said spring, and mechanism having connection with said clutch adapted to be moved to permit rotation of said rotatable member and sprocket or to lock said member against movement and move said clutch into operative position for rewinding said spring, and means for causing an automatic release of said clutch when said spring has been wound to a predetermined tension.

2. In an apparatus of the class described, a shaft rotatable in one direction, a rotatable disk and an independently-movable sprocket loosely mounted on said shaft, a coiled spring secured to said shaft and adapted to actuate said disk, means for causing said sprocket to rotate with said disk, a clutch adapted to be thrown into engagement with said sprocket to rotate said shaft for winding said spring, and mechanism for normally locking said disk against movement and retaining said clutch in inoperative position, said mechanism adapted to be moved to permit said disk to rotate and to throw said clutch into operative position.

3. In an apparatus of the class described, a shaft rotatable in one direction, a rotatable disk and an independently-rotatable sprocket loosely mounted on said shaft, said sprocket being adapted to be moved by the rotation of said disk, a coiled spring for actuating said disk, means for automatically winding said spring after it has spent its energy, and a vertically and horizontally movable controlling mechanism normally positioned to lock said disk against movement and to retain said winding means in inoperative position.

4. In an apparatus of the class described, a shaft rotatable in one direction, a rotatable member and an independently-rotatable sprocket loosely mounted on said shaft, a spring for causing a movement of said rotatable member when released, means for causing said sprocket to move with said member, means for automatically winding said spring after it has spent its energy, a vertically and horizontally movable controlling member normally positioned to lock said rotatable member against movement and to retain said winding means in inoperative position, and adapted to be moved to permit said rotatable member to rotate and then to lock the same against movement and to throw said winding means into operative position, and means for causing a cessation of the winding of said spring when it has been wound to a predetermined tension.

5. In an apparatus of the class described, a shaft rotatable in one direction, an actuating member secured thereto, a disk loosely mounted on said shaft and moved by said actuating member, an independently-movable sprocket, a disk secured to said sprocket and having a peripheral flange, a series of pawls secured to said former disk and adapted to frictionally engage the flange of said latter disk and impart motion to said sprocket, a clutch mechanism adapted to be thrown into engagement with said sprocket to rotate said shaft, a vertically and horizontally movable controlling-block having connection with said clutch mechanism and adapted to be moved to permit a movement of said actuating member, means tending to draw said block in one direction and retain said clutch in operative position for storing energy in said actuating member, and means adapted to throw said clutch into inoperative position when sufficient energy has been stored in said member.

6. In an apparatus of the class described, a shaft rotatable in one direction, a coiled spring having its inner end secured thereto and adapted to be wound in the direction of rotation of said shaft, a rotatable member loose on said shaft and adapted to be rotated by a centripetal unwinding movement of said spring, a sprocket loose on said shaft and adapted to be moved by and have an independent movement of said rotatable member, and mechanism for controlling the movement of said member.

7. In an apparatus of the class described, a shaft rotatable in one direction, a coiled spring having its inner end secured thereto and adapted to be wound in the direction of rotation of said shaft, a rotatable member loosely mounted on said shaft and adapted to be rotated by a centripetal unwinding of said spring, a power-transmission element loosely mounted on said shaft and adapted to be moved by and to have an independent movement of said member, a clutch mechanism, and mechanism for controlling the movement of said rotatable member adapted to be moved to throw said clutch mechanism into operative or inoperative position for the purpose described.

8. In an apparatus of the class described, a shaft rotatable in one direction, a spring secured thereto, a member rotated by said spring and having one or more notches on its periphery, an element movable by said member, controlling mechanism for said member comprising a vertical reciprocatory block having a portion shaped to engage the notches in said member, and means for moving said block out of engagement with said notches to permit of a movement of said parts.

9. In an apparatus of the class described, a shaft rotatable in one direction, a spring secured thereto, a rotatable member actuated by said spring and having one or more notches in its periphery, a power-transmission element movable by said member, a clutch mechanism adapted to engage said element and cause a rotation of said shaft to store energy in said spring, and means for controlling said parts comprising a vertically and horizontally movable block having connection with said clutch mechanism, means tending to move said block to throw said clutch into operation, an operating-lever for moving said block out of engagement with said rotatable member, and a portion provided on said block adapted to coact in such manner with one of the notches on said member as to cause said block to move and throw said clutch mechanism into inoperative position when said spring has been wound to a predetermined tension.

10. In an apparatus of the class described, the combination of a spring, a disk, and an independently-movable member actuated by said spring, a clutch mechanism adapted to be moved to wind said spring, a controlling member having operative connection with said clutch mechanism and having parts coacting with said disk and adapted to be moved into a series of operative positions with respect to said disk, the coacting parts of said member and disk being shaped to adapt them when in one position to cause a movement of said member to move said clutch to inoperative position when the spring has been wound to a predetermined tension and permit said disk and clutch mechanism to stand at rest.

11. In an apparatus of the class described the engine-shaft, an auxiliary shaft rotatable in one direction, a rotatable member, means for actuating said member in one direction, connection between said means and said auxiliary shaft, a power-transmission element connected to the engine-shaft, adapted to be moved by and have movement independent of said member, and mechanism adapted to be moved to permit said member to rotate, or to lock the same against movement and simultaneously connect the engine-shaft with said actuating means whereby to automatically cause the energy lost in the rotating of said member to be restored to said actuating means.

In testimony whereof I have hereunto signed my name to this specification in the presence of two subscribing witnesses.

NOBLE W. HARTMAN.

Witnesses:
ELI A. STARK,
CORNELL SCHREIBER.